United States Patent
Yee et al.

[11] Patent Number: 6,151,497
[45] Date of Patent: Nov. 21, 2000

[54] SATELLITE BASED HIGH BANDWIDTH DATA BROADCAST

[75] Inventors: David Moon Yee, Scottsdale; Robert Henry Bickley, Paradise Valley; Philip John Zucarelli, Glendale; Theodore W. Keller; Jeff S. Osman, both of Scottsdale; Randall K. Derr, Phoenix, all of Ariz.

[73] Assignee: Motorola, Inc., Schaumburg, Ill.

[21] Appl. No.: 09/022,828

[22] Filed: Feb. 12, 1998

[51] Int. Cl.[7] .................................................. H04Q 7/20
[52] U.S. Cl. ........................ 455/430; 455/427; 455/12.1
[58] Field of Search .................................. 455/430, 427, 455/12.1; 370/316; 380/49, 21

[56] References Cited

U.S. PATENT DOCUMENTS

| | | | |
|---|---|---|---|
| 5,448,206 | 9/1995 | Newhall | 332/103 |
| 5,448,623 | 9/1995 | Wiedeman et al. | 455/430 |
| 5,689,568 | 11/1997 | Laborde | 380/49 |
| 5,724,345 | 3/1998 | Guarneri et al. | 370/316 |
| 5,889,861 | 3/1999 | Ohashi et al. | 380/21 |
| 5,990,928 | 11/1999 | Sklar et al. | 348/8 |
| 5,999,526 | 11/1999 | Garland et al. | 370/352 |

*Primary Examiner*—Lee Nguyen
*Assistant Examiner*—Isaak R. Jama
*Attorney, Agent, or Firm*—Bradley J. Botsch

[57] ABSTRACT

A satellite based broadcast data communications service for a satellite communications system is presented which allows a data information service provider (40) to send large blocks of data information to mobile subscriber units (50). A satellite gateway (30) is coupled to a service provider (40) via a ground link (42) and to a satellite communications network (10) via a gateway link (36). A mobile subscriber unit (50) is coupled to the satellite communications network (10) via both a message link (56) and a high-speed high-bandwidth downlink (58). The mobile subscriber unit sends a data request for requested data information to service provider (40) via message link (56), satellite communications network (10), gateway link (36), gateway (30), and ground link (42). Service provider (40) responds by retrieving and sending the requested data information to the requesting subscriber unit (50) via ground link (42), gateway (30), gateway link (36), satellite communications network (10), and high-speed high-bandwidth downlink (58). Service provider (40) sends a set of standard data information to the satellite communications network (10) to be broadcast over the high-speed high-bandwidth downlinks (58). Each subscriber unit 50 receives the broadcast standard data information, preferably only those portions for which the subscriber unit (50) has access authorization. The satellite based broadcast data communications service provides for data requests, data delivery, data access control, delivery priority, and billing for use of the system.

11 Claims, 2 Drawing Sheets

SATELLITE BASED HIGH BANDWIDTH DATA BROADCAST

FIELD OF THE INVENTION

The present invention pertains to satellite communications, and, more particularly, to a satellite based broadcast data communications service for a satellite communications system for allowing a data information service provider to send large blocks of data information to mobile subscriber units.

BACKGROUND OF THE INVENTION

Data communication services are essential in present day network communications systems. While many services, such as networked applications sharing common files and internet web browsers, generally require a bidirectional communication interface, many data services operate for the most part as a uni-directional service. Examples of such services are file transfers of large blocks of data such as weather map information, position, vector and course information from other mobile users, airport ground information, and audiovisual entertainment.

A critical point in providing or receiving data services is the ability to connect to the network. In present day network systems, it is not necessary for each user to connect directly to the network. Rather, users typically connect remotely to the network via modem by dialing a conventional telephone number of an access point. The access point is typically a switch owned by a network service provider through which remote callers are authenticated as authorized users and then connected to the network. One difficulty in present networked systems is the ability to maintain a network connection, either directly or remotely, when a user is mobile. Most local communications networks are ground based and use line of sight (LOS) communications links. These types of communication systems work well when each node in the communication network is stationary. However, if a network node is mobile, as for example an airborne aircraft or a mobile ground equipment vehicle, the ability to maintain a connection to a communications network becomes more difficult, especially where the mobile user travels far distances or across several geographical boundaries. This occurs because the mobile user moves in and out of range of any single ground based communication system. Furthermore, even in cellular radiotelephone communications system, which provide communication links for moving subscriber units, the ground based switching centers, or "cells", must each be in communication and are required to conduct a lengthy subscriber authentication processing order to service a "roaming" subscriber unit that is out of range of its "home" cell but which is within the range of control of a "visited" cell. This results because only the home cell of a subscriber has full access to its authentication information (e.g, the subscriber unit identifier (ID) which uniquely identifies the subscriber unit from other subscriber units). Accordingly, the overhead involved in sending a message is quite high, impractical, and even impossible when the subscriber moves out of range of any cell in the cellular network. Furthermore, subscriber units of cellular based communication systems are not set up to handle large blocks of incoming data at high speeds. In addition, in order to send data from one node in a communication network to another, the location of the destination network node must be known. Where a subscriber travels in and out of the range of communication of several ground based communication systems, the location of the subscriber unit is always changing and hence not necessarily known. Accordingly, it is very difficult to send data, and especially large blocks of high-speed high-bandwidth data, to mobile users in a communication system.

What is needed is a system and method for providing timely delivery of large blocks of digital data on a one-way as-needed basis from a data information service provider to a mobile user.

BRIEF DESCRIPTION OF THE DRAWING

The invention will be better understood from a reading of the following detailed description taken in conjunction with the drawing in which like reference designators are used to designate like elements, and in which.

DETAILED DESCRIPTION

The present invention provides a satellite based broadcast data communications service which allows ground based service providers to broadcast high bandwidth data information to mobile users. Data information suitable for broadcasting by the satellite based broadcast data communications service of the invention includes weather map information, position, vector and course information from other mobile users, airport ground information, and audiovisual entertainment. In accordance with the invention, the satellite based broadcast data communications system can be configured by the system's users to target a particular individual user or group of users with high bandwidth data according to an addressing scheme defined by a communications link protocol. Users, hereinafter "subscribers", subscribe to service providers to obtain particular data services. The satellite based broadcast data communications service allows subscribers to access only the information which they subscribe to or are registered for. Additional services can be accessed by requesting information from the service provider. Individual mobile subscribers or subscriber applications request downloads of particular digital information through data messages transmitted over a lower bandwidth data channel. The requested high bandwidth data is broadcast via satellite over a one-way high-bandwidth downlink. The satellite based broadcast data communications service is also configurable to collect system usage information for use in possible collection of fees from system subscribers. The satellite based data broadcast communications service of the invention allows data information service providers to provide data information to mobile subscribers across different geographic regions.

In accordance with the invention, there is provided a low-orbit global-coverage satellite network through which digital data information is transmitted and received. Further in accordance with the invention, mobile subscribers are supplied with a satellite communications subscriber unit which has the capability of sending data requests and receiving requested high-bandwidth data information from a satellite network over a high bandwidth downlink.

An illustrative embodiment of the satellite based broadcast data communications service is described herein in the context of an avionic communications system. However, it will be appreciated by those skilled in the art that the principles of the invention extend to any communications system having mobile subscribers.

Figure 1:
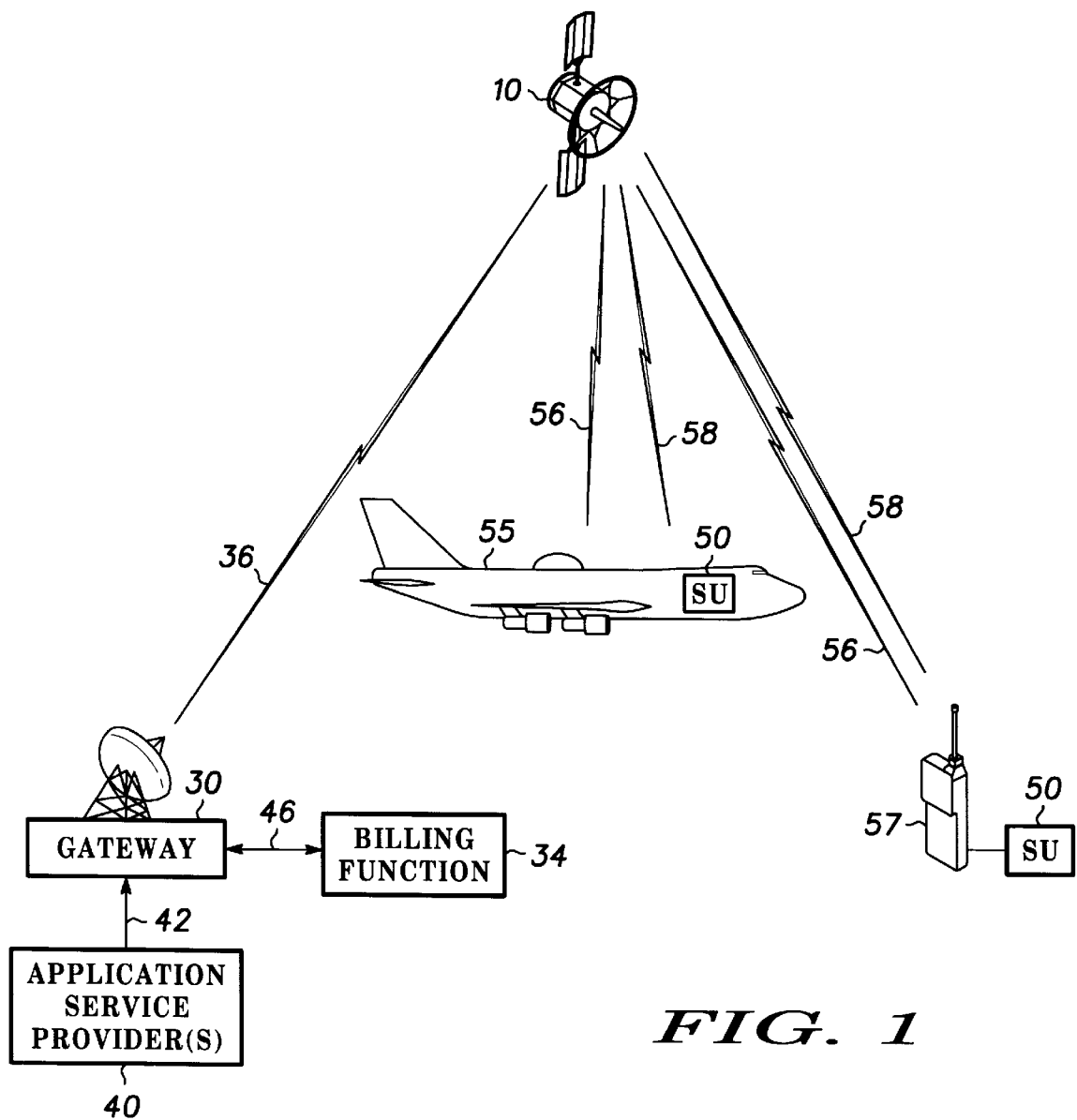
FIG. 1 is a diagram of a system in accordance with the invention.

FIG. 1 illustrates a system in accordance with the invention. The avionics communications system includes a service provider 40, a satellite communications network 10, a satellite gateway 30, and one or more subscribers, shown as aircraft 55 and ground equipment 57. Ground equipment 57 can be stationary or mobile. Service provider 40 can be a single entity or can include multiple independently operated service provider entities. Aircraft 55 and ground equipment 57 are each equipped with a subscriber unit 50. Each subscriber unit 50 is configured to transmit data requests over a low bandwidth data channel to satellite communications network 10.

Data requests are routed through satellite communications network 10, to gateway 30 over a satellite ground link 36, and to service provider 40 via ground link 42. Gateway 30 grants service provider 40 access to a satellite high bandwidth downlink 58, ad controls channel and transmission time assignments. Gateway 30 relays the requested data information to satellite communications network 10 through link 36. Satellite communications network 10 then transmits the requested data information to subscriber units 50 over high bandwidth downlinks 58.

A broadcast link protocol includes information about which subscribers are authorized to access which services. A controller or programmed process in the subscriber units 50 allows the subscriber to access broadcast data information only if the proper authorization is included in the link protocol. Broadcast data information is sent from service provider 50 to subscriber units 50 continuously, at rates appropriate to the particular application. The satellite based broadcast data communications service of the invention is capable of supporting applications requiring rapid updates, such as cockpit display of traffic information (CDTI). Subscriber unit 50 collects all data of potential interest to the subscriber, limited only by access authorization and memory limitations of the subscriber unit 50. The subscriber (i.e, pilot, airport personnel, passengers, or equipment operator) can select particular information for display. In addition, or alternatively, the requested information is sent to automated applications executing with the aircraft 55 or ground equipment 57.

Subscribers access data information which is not included in the standard broadcast by generating data requests addressed to the appropriate service provider. The subscriber generates the data request via a user interface of subscriber unit 50. Subscriber unit 50 processes the request and send it to satellite communications system 10 over a low bandwidth message link 56. Message link 56 is a separate low bandwidth bidirectional communications channel connection between satellite 20 and subscriber 50. Satellite communications system 10 routes the data request to gateway 30 over link 36, where it is routed to service provider 40 over ground link 42. Service provider 40 retrieves the requested data information and sends to gateway 30 over ground link 42, which routes it to satellite communications network 10 over gateway link 36. A satellite in satellite communication network 10 includes the requested information in the standard broadcast stream which is broadcast over high bandwidth downlinks 58. The requested data information is addressed to the requesting subscriber according to the link protocol. Upon proper receipt of the requested data information, the requesting subscriber's subscriber unit 50 sends an acknowledgement message to gateway 30 and or service provider 40 through a message routing and delivery service via message link 56. Gateway 30 is in communication with a billing function 34 over link 46 to generate billing data for service provider 40 indicating the request and delivery of specific information to a particular subscriber unit 50. Service provider 40 uses the billing data for billing the requesting subscriber for the data information requested and or for usage of the system.

Figure 2:
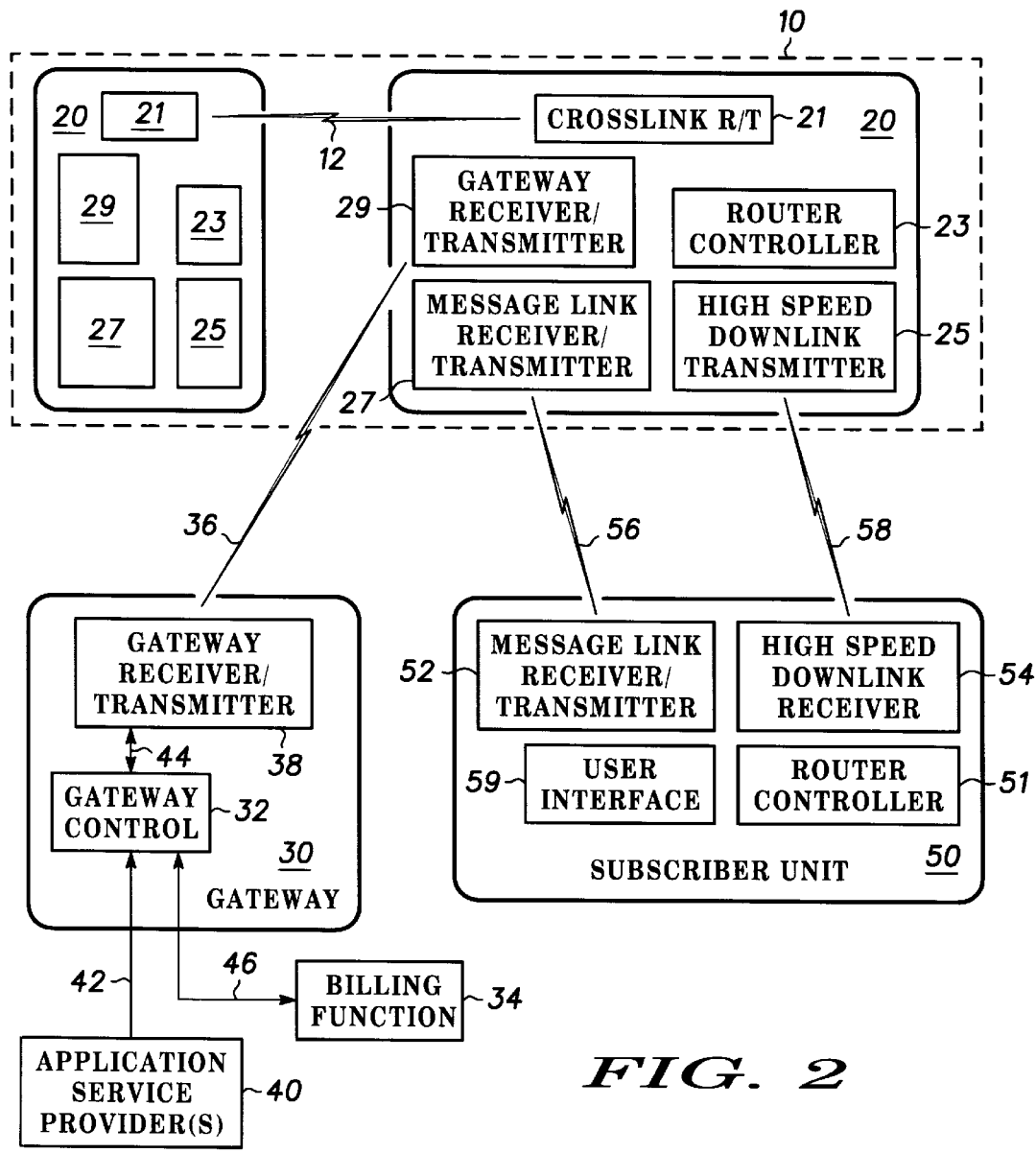
FIG. 2 is a block diagram illustrating the functionality of each of the nodes of the system of FIG. 1.

FIG. 2 is a block diagram illustrating the functionality of each of the nods of the avionics communications system of FIG. 1. Service provider 40 is configured to accept data information requests routed to it by gateway 30, and to respond by sending the requested data information to the requesting subscriber unit 50 via gateway 30, which causes it to be routed to the requesting subscriber unit 50. Gateway 30 preferably includes a transceiver 38 and a gateway control processor 32. Transceivers are known in the art, and generally include a transmitter device and a receiver device both coupled to an antenna. Gateway control processor 32 manages access to satellite communications network 10, to route signals between satellite communications network 10 and entities desiring access to it (e.g, service provider 40), and to manage channel access of gateway link 36. Gateway control processor 32 keeps track of data information requests and pre-scheduled data transmissions and the scheduling priorities assigned to each. Preferably, gateway control processor 32 also controls channel availability over message link 56. Accordingly, gateway control processor 32 can provide notification to subscribers 50 over message link 56 of expected delivery delays when heavy traffic builds up lengthy transmission queues in the satellites. Preferably, gateway control processor 32 includes a processor coupled to a memory and accompanying control hardware. Billing information, including the subscriber ID, for the delivery of data is extracted by gateway control processor 32 and sent to a billing function 34 as the data transmitted over gateway link 36.

The gateway link 36 to each satellite 20 provides wide band data delivery to the routing established by the requesting subscriber. Data information uplinks are performed in response to requests routed from subscriber units 50 over satellite message links 56, inter-satellite crosslinks 12, and gateway link 36, and or are automatically performed according to a preplanned schedule. The requested data information is preferably interleaved over gateway link 36 with other link traffic to a satellite 20 in the satellite communications network 10. The requested data information is interleaved using a time, frequency, or code multiplexing method (TDMA, FDMA, CDMA), which are all well-known in the art.

Each satellite 20 in satellite communications network 10 includes a crosslink transceiver 21, a router controller 23, a high speed wideband downlink transmitter 25, a message link transceiver 27, and a gateway transceiver 29. Router controller 23 manages inter-link communication and data routing over and between inter-satellite crosslinks 12, gateway links 36, data messaging links 56, and high bandwidth downlinks 58. Crosslink transceiver 21 transmits and receives data packets over crosslinks 12. Gateway transceiver 29 transmits and receives data packets over gateway links 36. Message link transceiver 27 transmits and receives data packets over messaging links 56. High speed wideband downlink transmitter broadcasts data packets over high bandwidth downlinks 58. Preferably, each of crosslink transceiver 21, high speed wideband downlink transmitter 25, message link transceiver 27, and gateway transceiver 29 includes an independent transmission queue for temporarily storing data packets that are waiting to be transmitted. The size of each independent transmission queue is preferably communicated to the gateway control processor 32 in gateway 30 so that it can notify subscriber units 50 if delays are to be expected due to heavy traffic through the satellite communications network 10. Router controller 23 preferably includes a processor and a memory in which an address register containing locations of nodes in the communications network is maintained. The location of each subscriber is updated in the address register of router controller 23 in each satellite 20. The subscriber locations are extracted from message acknowledgements sent after the successful receipt of requested data information or by periodic communication between satellite 20 and subscriber unit 50 over message link 56 when download traffic is light. When a data packet is received via one of the transceivers 21,27 29, router controller 23 looks up the location of the intended destination node of the data packet in the address register, determines which link and communications channel the data packet will be transmitted, and sends the data packet to the transmission queue of the appropriate transceiver 21, 27, 29 or transmitter 25 which handles the transmission of the data packet. In one embodiment, each data packet is originally assigned a priority by the application that generated it. Satellite router controller 23 preferably enters the data packet in the appropriate transceiver's or transmitter's transmission queue according to the data packet's original assigned priority.

A link protocol is employed wherein the address of the data packet includes not only the necessary overhead to multiplex and recover the data content but also a specific subscriber ID and coded access authorization. The subscriber ID and access authorization address a single subscriber unit 50 or a class or group of subscriber units 50. Data packets are access controlled wherein each subscriber unit 50 only accesses those transmissions which are specifically addressed to it and which the subscriber unit 50 has authorization to receive. In an alternative embodiment, the data information is encrypted to provide added security. In this embodiment, each subscriber unit 50 is provided the unique key either by a public key encryption system or another separate key distribution method. As described herein, the system is transparent to such encryption in that it simply delivers the data information to subscriber units 50, and each subscriber unit 50 reconstructs the data information so that it may have either a clear or encrypted data content without differentiation by this system.

Data is directed over high speed downlink 58 from a satellite 20 covering the current location of the requesting subscriber unit 50. Satellite downlink geographical coverage is managed by a satellite subsystem which steers antennas to assure a single satellite covers needed geographical area. As each satellite 20 moves over the geography, the area of responsibility is transferred from a setting satellite to a rising satellite, and data traffic is routed to the correct satellite to serve subscribers in each geographical area. This coordination is accomplished via inter-satellite crosslinks 12. As a subscriber unit 50 passes from a given satellite's coverage (or the satellite coverage moves away from the subscriber unit), rerouting is accomplished seamlessly via crosslink communications. The subscriber unit location information is maintained by satellite router controllers 23 such that any message uplinked for a given subscriber may be directed via crosslink 12 using this information. In this manner a single gateway 30 may provide data to a subscriber 50 unit anywhere on the earth as long as the satellite communications network provides global coverage. It will be appreciated by those skilled in the art that multiple gateways 30 can also be accommodated since each data packet includes source IDs as well as destination IDs, thus allowing the data packet to be properly routed.

Where data information is to be broadcast to multiple subscriber units 50, the data information is routed to the satellites 20 in satellite communications network 10 which provide coverage over all of the destination subscribers. Accordingly, the same data information may be broadcast by multiple satellites 20 over multiple high bandwidth downlinks 58 to cover the locations of all addressed destination subscriber units 50.

The invention described herein provides a solution for achieving interoperability between terrestrial based cellular systems and satellite based cellular systems. Although the invention has been described in terms of the illustrative embodiment, it will be appreciated by those skilled in the art that various changes and modifications may be made to the illustrative embodiment without departing from the spirit or scope of the invention. It is intended that the scope of the invention not be limited in any way to the illustrative embodiment shown and described but that the invention be limited only by the claims appended hereto.

What is claimed is:

1. A satellite based broadcast data communications system for allowing a data information service provider to send large blocks of data information to mobile subscriber units, comprising:

a satellite gateway coupled to said service provider;

a satellite communications network coupled to said satellite gateway via a gateway link;

a mobile subscriber unit coupled to said satellite communications network via both a message link and a high-speed high-bandwidth downlink, said mobile subscriber unit comprising means for sending a data request for requested data information to said service provider via said message link, and means for receiving said requested data information via said high speed high bandwidth data link, wherein said subscriber unit comprises means for blocking access to portions of said data information, wherein:

said data information comprises digital data packets, each said digital data packet comprising a subscriber identification (ID), an access code, and a data payload comprising a portion of said data information; and said access authorization means comprises:

identification matching means for comparing a subscriber unit ID of said mobile subscriber unit with said subscriber ID of a received said data packet and providing an ID match indication if said subscriber unit ID is included in said subscriber ID;

access code matching means for reading said access code of said received data packet and providing an access granted indication if said mobile subscriber unit is authorized to access said data payload of said received data packet; and said blocking means comprising means for blocking access to said data payload unless both said identification matching means provides said ID match indication and said access code matching means provides said access granted indication.

2. A satellite based broadcast data communications system in accordance with claim 1, wherein:

said satellite communications network broadcasts said standard data information over said high-speed high-bandwidth downlink; and said mobile subscriber unit receives selected portions of said standard data information, said mobile subscriber unit includes means for authorizing access to said selected portions.

3. A satellite based broadcast data communications system in accordance with claim 1, wherein:

said data information is encrypted; and said mobile subscriber unit comprises decrypting means for decrypting information data received via said high-speed high-bandwidth downlink.

4. A satellite based broadcast data communications system in accordance with claim 3, wherein:

said mobile subscriber unit comprises with a unique decryption key via said message link by a public key encryption system.

5. A satellite based broadcast data communications system in accordance with claim 1, wherein:

said satellite gateway extracts billing information from said data requests.

6. A satellite based broadcast data communications system in accordance with claim 5, comprising:

a billing function for receiving and processing said billing information extracted by said satellite gateway to assign fees to be billed to said mobile subscriber unit.

7. A mobile subscriber unit for use with a satellite based broadcast data communications service operating in a communications system comprising a satellite gateway coupled to a data information service provider via a ground link, a satellite communications network coupled to said satellite gateway via a gateway link, said mobile subscriber unit comprising:

a message transceiver coupled to said satellite communications network via a message link for sending and receiving data messages;

a user interface which receives a data request for requested data information;

a controller for processing said data request and sending said data request to said message transceiver to be transmitted by said message transceiver to said service provider via said message link, said satellite communications network, said gateway link, said gateway, and said ground link;

a high-speed high-bandwidth data receiver coupled to said satellite communications network via a high-speed high-bandwidth downlink which receives said requested data information, said requested data information being retrieved by said service provider in response to said data request and sent from said service provider via said ground link, said gateway, said gateway link, said satellite communications network, and said high-speed high-bandwidth downlink, wherein said high-speed high-bandwidth receiver receives only portions of said data information broadcast for which said mobile subscriber unit has access authorization; and access authorization detecting means for determining whether said mobile subscriber unit has authorization to access said portions of said set of data information which is broadcast over said high-speed high-bandwidth downlink, and for block access to said portions of data information by a user of said mobile subscriber unit if said access authorization detecting means determines that said mobile subscriber unit does not have said authorization.

8. A mobile subscriber unit in accordance with claim 7, wherein:

said high-speed high-bandwidth receiver receives a standard data information broadcast;

said standard data information broadcast sent by said service provider to said satellite communications network via said ground link, said gateway, and said gateway link, and broadcast by said satellite communications network over said high-speed high-bandwidth downlink.

9. A mobile subscriber unit in accordance with claim 7, wherein:

said service provider sends said data information in digital data packets, each digital data packet comprising a subscriber identification (ID), an access code, and a data payload comprising a portion of said data information; and said access authorization detecting means comprises:

identification matching means for comprising a subscriber unit ID of said mobile subscriber unit with said subscriber ID of a data packet received via said high-speed high-bandwidth downlink and providing an ID match indication if said subscriber unit ID is included in said subscriber ID; and access code matching means for reading said access code of said received data packet and providing an access granted indication if said mobile subscriber unit is authorized to access said data payload of said received data packet; and blocking means for blocking access to said data payload unless both said identification matching means provides said ID match indication and said access code matching means provides said access granted indication.

10. A mobile subscriber unit in accordance with claim 9, wherein:

said service provider comprises encryption means for encrypting said data information; and said mobile subscriber unit comprises decrypting means for decrypting information data received via said high-speed high-bandwidth downlink.

11. A mobile subscriber unit in accordance with claim 10, wherein:

said mobile subscriber unit is provided with a unique decryption key via said message link by a public key encryption system.

* * * * *